United States Patent [19]
Guezou et al.

[11] Patent Number: 5,530,694
[45] Date of Patent: Jun. 25, 1996

[54] DEVICE FOR CONNECTING A STATION TO A LOCAL AREA NETWORK COMPRISING AT LEAST ONE RING

[75] Inventors: Jean Guezou; Jean Lassaux, both of Lannion, France

[73] Assignee: Societe Dite Alcatel N.V., Amsterdam, Netherlands

[21] Appl. No.: 83,190

[22] Filed: Jun. 29, 1993

[30] Foreign Application Priority Data

Jul. 10, 1992 [FR] France ................................. 92 08613

[51] Int. Cl.⁶ ............................................. H04L 12/437
[52] U.S. Cl. .................................... 370/16.1; 340/827
[58] Field of Search ................... 370/16.1, 85.5, 370/16, 85.13, 85.1, 85.4, 85.14, 85.15; 371/8.2, 8.1, 20.5, 20.6, 11.1, 11.2; 340/827, 825.05, 825.01; 379/221, 220; 395/181, 182.01

[56] References Cited

U.S. PATENT DOCUMENTS

| | | | |
|---|---|---|---|
| 4,747,097 | 5/1988 | Ohya et al. | 370/16.1 |
| 5,179,548 | 1/1993 | Sandesara | 370/16.1 |
| 5,218,600 | 6/1993 | Schenkyr et al. | 370/16.1 |

FOREIGN PATENT DOCUMENTS

| | | |
|---|---|---|
| 0089276 | 9/1983 | European Pat. Off. . |
| WO83/00238 | 1/1983 | WIPO . |

OTHER PUBLICATIONS

International Conference On Communications, vol. 3, Jun. 1982, New York, USA, pp. 6C.3.1–6C.3.5, M. Tada et al.: "N6770 Datalink—A Homogeneous Optical Ring Network".

*Primary Examiner*—Douglas W. Olms
*Assistant Examiner*—Dang Ton
*Attorney, Agent, or Firm*—Sughrue, Mion, Zinn, Macpeak & Seas

[57] ABSTRACT

A device for connecting a station to a local area network comprising at least one ring includes switching arrangements associated with circuits for regenerating a signal in order to bypass a station when it is out of service and compensate the attenuation and phase jitter caused by the upstream ring segment. This device enables any number of stations to be taken out of service without seriously degrading operation of a ring. The device is usable in local area networks comprising one or more high-speed (125 Mbauds) rings.

5 Claims, 5 Drawing Sheets

DEVICE FOR CONNECTING A STATION TO A LOCAL AREA NETWORK COMPRISING AT LEAST ONE RING

BACKGROUND OF THE INVENTION

1. Field of the Invention

The invention concerns a device for connecting a station to a local area network comprising at least one ring.

2. Description of the Prior Art

In a network of this kind stations are connected in series by a ring. Data is transmitted on this ring in the form of frames each comprising a sender address and a recipient address. Each station retransmits each data frame that it receives. Conflicts between multiple stations requiring to send data frames are prevented by means of a special frame called a token circulating continuously on the ring. When a station wishes to send data it takes the token and substitutes for the token frame one or more data frames. It releases the token at the end of sending these frames. The other stations merely retransmit unchanged the data frames that they receive. The station to which a data frame is addressed recognizes its identity in the recipient address carried by the data frame. It stores the content of the data frame and then retransmits the frame after adding a "received" indicator. The station which sent the data frame receives it after it has travelled right around the ring. This station recognizes its identity in the sender address carried by the data frame and stops the circulation of the data contained in the data frame.

A local area network usually comprises two rings to ensure some continuity of service in the event of either ring going down. For example, U.S. Pat. No. 5,081,452 of 14 Jan. 1992 describes a local area network with one ring, a local area network with two rings and a local area network with four rings. Each ring is supported by an electrical cable. In these three embodiments the connection device comprises an insertion relay for each station comprising a double changeover switch operated by a solenoid for bypassing the station when it is out of service in order to maintain the electrical continuity of the ring. The insertion relay thus enables a station or part of a station to be taken out of service without totally halting operation of the other stations. The embodiment comprising two rings enables operation of all stations to be maintained even if one of the cables connecting two consecutive stations should break.

In the embodiment with four rings each station comprises two couplers and operation of all stations can be maintained if either coupler is down.

Switching between the various rings is effected by electromechanical relays similar to that of the insertion relay for bypassing each station.

If any of these relays operates it causes a very short interruption to operation of the network which is absorbed by the protocol governing exchange of data on the ring or rings.

However, consideration is being given to implementing local area networks at much higher bit rates. The article "The Fiber Distributed Data Interface" by Floyd E. Ross, Journal of Data and Computer Communications, Winter 1991, pages 4–22 describes a local area network operating at 125 Mbauds comprising two rings supported by respective optical fibers. The station connection device comprises, for each station and for each ring, an optical switch for bypassing the respective station when it is out of service. In the current state of the art the optical relays are electromechanical and have a switching time at the millisecond level. Switching of either of the optical relays causes a very short term break whose duration is nevertheless very long relative to the duration of the binary data frames transmitted on the rings. This causes disturbance to operation of the network which is compatible with some applications, such as office automation applications, but which is not compatible with real time applications. Additionally, the electromagnetic optical relays introduce significant attenuation and phase jitter which are respectively added to the attenuation and the phase jitter generated by the ring segment between the station in question and the last regenerator device on its upstream side. It is possible to take one station out of service but it is not possible to take a greater number of stations out of service on the same ring as the accumulation of attenuation and phase jitter increase the bit error rate and may even prevent operation of the network. The connection device therefore enables one station to be bypassed should only one station go down but does not tolerate simultaneous failure of more than one station or progressive installation and commissioning of stations.

The patent application WO 83/00 238 describes a connection device comprising a regenerator and a switching device. It sends in the downstream direction either a regenerated signal from the upstream side or a signal supplied by the station connected by the connection device in question. If the station is absent or out of service the switching device sends the regenerated signal. It can bypass any number of stations because the regenerator means compensate for the attenuation and the phase jitter caused by the ring segment on the upstream side of the station taken out of service.

This device still has a drawback, however: if a station is out of service and if the regenerator goes down transmission in the downstream direction is interrupted. This can happen if the local power supply fails, for example.

An object of the invention is to remedy this drawback.

SUMMARY OF THE INVENTION

The invention consists in a device for connecting stations to a local area network comprising one or more rings supplying signals to said device, said signals being generated by said stations, said connection device comprising a connection module for each station and for each of said rings and said connection module comprising:

means for regenerating signals supplied by one of said rings, and first switch means to route said regenerated signals to said station when it is in service or to route said regenerated signals to a next station, bypassing said station when it is not in service, each connection module further comprising second switch means for routing the signals circulating in each ring in such a way as to bypass said regenerator means when said station is out of service and said regenerator means are also out of service.

The above device can remedy failure of the regenerator means. The second switching means may naturally be used only for a restricted number of stations, for the reasons already mentioned. This is not a real drawback, however, as the second switching means are used only in the event of failure of the regenerator means of one of the connection modules. This is much less probable than a station being taken out of service. This latter case covers the progressive installation of stations during which many station locations may remain empty for long periods, each location nevertheless comprising the connection means provided for a station. During this long period failure of the regenerator means can block the circulation of signals on one ring and it is therefore particularly advantageous to be able to remedy this fault, even if this facility is restricted to a single connection module on each ring.

According to another feature of the invention the regenerator means comprise a narrowband filter for recovering a clock signal and filtering the phase jitter of the signals circulating on the ring corresponding to said regenerator means.

This device is particularly simple to implement and can recover a clock signal to regenerate the signal circulating on the ring when the station is out of service and to operate the station when it is in service.

According to another feature of the invention the first switching means comprise means for detecting the presence of a station connected to said module and for routing signals circulating on the corresponding ring if the station is absent.

This device enables automatic switching of the first switching means if the station is out of service because it is absent.

In a preferred embodiment of the invention, in the connection device for a local area network comprising at least one ring supported by an electrical cable, the first switching means essentially comprise a high-speed (ECL, for example) technology multiplexer inserted into the ring in series with the regenerator means and the second switching means essentially comprise a high-speed (ECL, for example) technology multiplexer inserted directly into the ring.

This device is faster than an electromechanical relay device and not only enables operation to be maintained with a large number of stations out of service but also enables a station to be bypassed in the very rare but highly prejudicial situation in which not only a station but also its regenerator means are out of service. In this case the multiplexer enables operation of the ring to resume after an interruption of negligible duration and at the cost of levels of attenuation and phase jitter which restrict to one or two the number of stations which can be bypassed without regenerating the signal.

When the network comprises two rings each supported by a series of electrical conductors connecting cables grouped into a plurality of groups with each group plugged into a backplane carrying the connection modules associated with the group of stations (one module per ring and per station), in a preferred embodiment all the connection modules are identical and each comprises:

a first ring input for connecting the module to another module by means of an electrical cable;

a second ring input for connecting the module to another module of the same group by means of a conductor on the backplane of said group;

means for automatically selecting the first ring input on detection of the presence of a cable connected to said input and for selecting the second ring input on detecting the absence of any cable connected to the first input;

a first ring output for connecting the module to another module by means of an electrical cable; and a second ring output for connecting the module to another module of the same group by means of a conductor of the backplane of said group; the first and the second ring outputs supply two identical signals.

This preferred embodiment enables use of a single type of connection module for all stations because the first ring input and the first ring output can be used for connection by cable, primarily to connect two different groups of stations, while the second ring input and the second ring output can be used to connect two stations of the same group by means of a conductor on the backplane, which is a simple way to make a connection with a given characteristic impedance.

The invention will be better understood and other details will emerge from the following description and the accompanying figures.

DETAILED DESCRIPTION OF THE INVENTION

Figure 1:
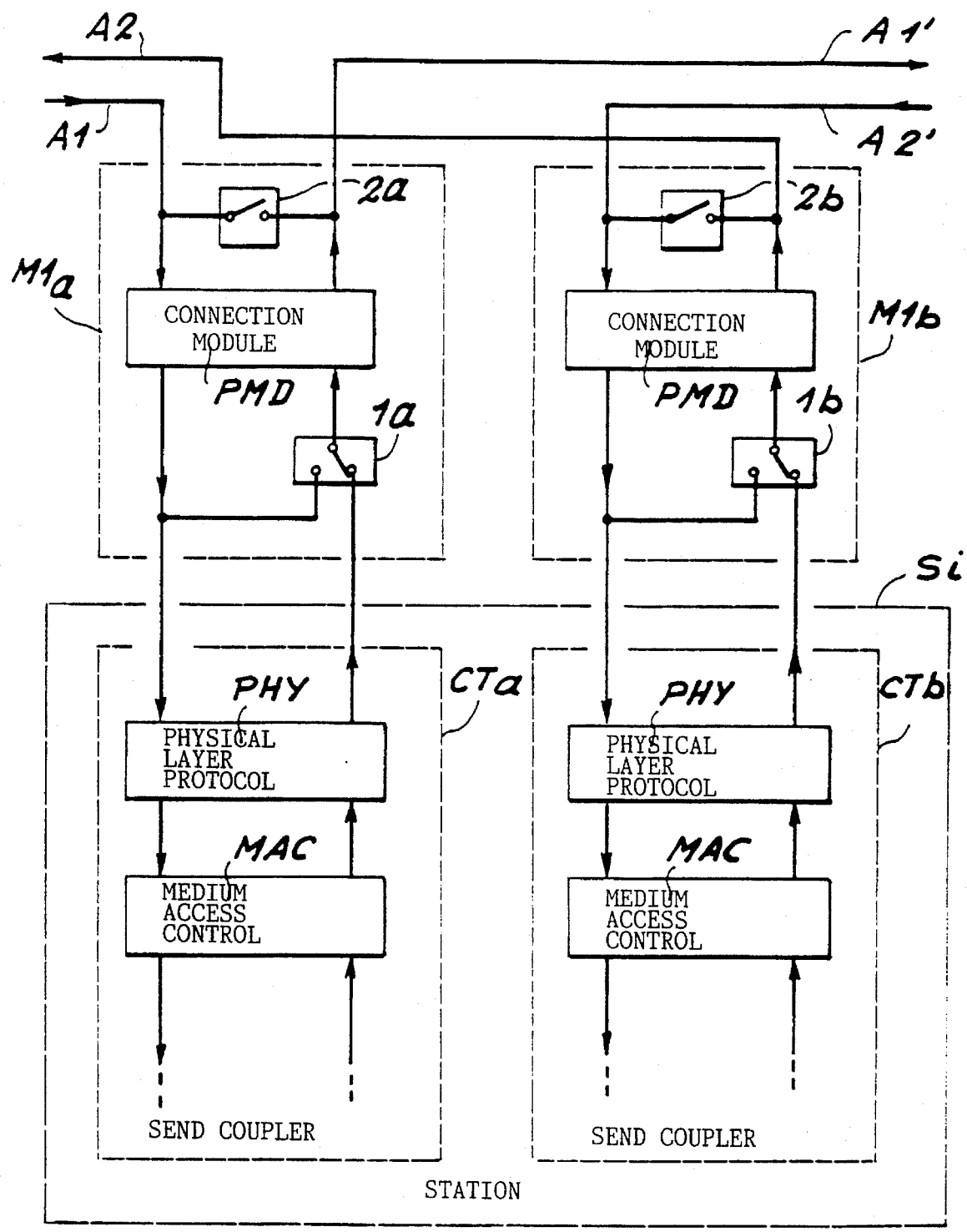
FIG. 1 shows the block diagram of two connection modules of one embodiment of a device in accordance with the invention.

The embodiment whose block diagram is shown in FIG. 1 is suitable for a network with two rings. The two rings may be supported by respective electrical cables if the total length of the ring does not exceed some 100 meters and for greater lengths they may be supported by two optical fibers. This embodiment can be applied to one of the networks described in the above-mentioned article or patent application, for example.

FIG. 1 shows the connection of a single station Si but the block diagram would be exactly the same for all other stations of the network. The station Si includes two send couplers CTa and CTb for coupling it to the respective rings. The coupler CTa is connected to two segments A1 and A1' of the first ring by a connection module M1a. The coupler CTb is connected to two segments A2, A2' of a single second ring by a connection module M1b having the same functional structure as the coupler M1a.

The send couplers CTa and CTb both comprise two functional layers: a physical layer protocol PHY and a medium access control layer MAC. The PHY layer handles encoding and decoding, clock signal processing and framing of data for transmission. The MAC layer handles medium access, addressing, data integrity control, frame sending and frame receiving. The other functional layers of the station Si are not shown. They include a station management layer which handles the configuration of the station and of the rings and which handles all operations of the station in the rings. These layers are implemented in conformance with the international standard ISO/IECJTC1/SC 25.

The two connection modules M1a and M1b have the same functional structure and comprise a physical medium dependent (PMD) functional layer. The PMD layer handles matching to the transmission medium employed, i.e. an optical fiber, for example, using components such as an optical sender and receiver appropriate to the type of medium used.

A first input of the PMD layer is connected to segment A1 which supplies a signal arriving from the first ring. A first output of the PMD layer is connected to the segment A1' of the first ring and supplies a signal to it. A second input of the PMD layer is connected to an output of a first switch function 1a. A second output of the PMD layer is connected direct to an input of the PHY layer of the coupler CTa and to an input of the first switch function 1a. This second output supplies a signal regenerated from the incoming signal at the first input of the PMD layer. A second input of the switch function 1a is connected to an output of the PHY layer of the coupler CTa.

A second switch function 2a connects the segments A1 and A1' of the first ring. The second switch function 2a is shown diagrammatically as a switch because it can route signals from segment A1 direct to segment A1' of the first bus bypassing the PMD layer of the module M1a. Likewise, a second switch function 2b in the module M1b can route signals directly from segment A2' to segment A2 of the second ring.

The first switch function 1a is shown diagrammatically as a switch because when station Si is in service it can pass a signal supplied by the PHY layer to the second input of the PMD layer and when station Si is out of service it can pass the regenerated signal supplied by the second output of the PMD layer to this same input of the PMD layer.

Because of its high bit rate (125 Mbauds) the signal supplied by the ring is subject to attenuation and phase jitter dependent on the distance covered from the last time the signal was regenerated. If the switch function 1a bypasses station Si the signal transmitted by this switch function is subject to attenuation and phase jitter produced by the upstream ring segment. If the signal arriving from the ring were not regenerated before being retransmitted on the ring the attenuation and the phase jitter produced by the upstream segment would be added to the attenuation and phase jitter produced by the downstream segment and by the first switch function 1a, respectively. The accumulation of attenuation and phase jitter would eventually be so great that it would not be possible to maintain operation of a ring with several stations out of service. Using the connection device in accordance with the invention any number of stations may be absent because the attenuation and phase jitter due to the upstream ring segment are neutralized by regenerating the signal in the PMD layer.

The second switch function is used in situations that are encountered much less frequently, mainly in the event of failure of the PMD layer. This means that the signal must be routed without regenerating it. The phase jitter then caused by the second switch function 2a, 2b restricts the number of stations that can be bypassed on the same ring using the second switch function to one or two and this means that the maximum distance between stations must be restricted.

Likewise, the module M1b provides a second switch function 1b and a regeneration function similar to those just described for routing and regenerating a signal arriving on the segment A2' of the second ring before retransmitting it on the segment A2 when the station Si is out of service.

The connection modules M1a and M1b are in units physically separated from the station Si so that they are present and exercise their functions even if the station Si is absent.

An alternative embodiment would place the first switch function upstream of the first regeneration function to neutralize also the attenuation and phase jitter introduced by the first switch function.

Figure 2:
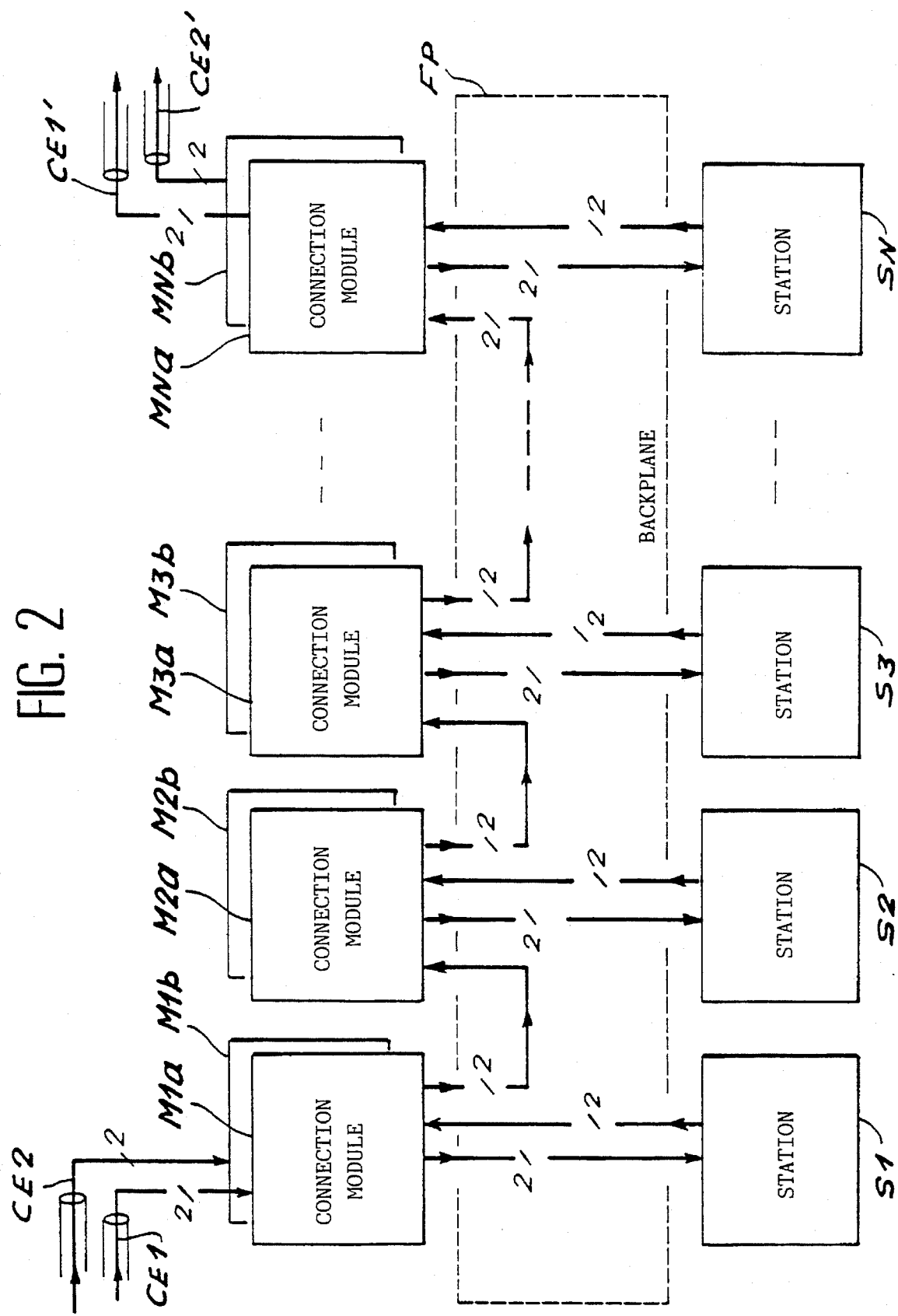
FIG. 2 shows a block diagram of connections between connection modules of a group of N stations in one embodiment of a device in accordance with the invention.

FIG. 2 shows the block diagram of the connections in a group of N stations of a local area network which may comprise a plurality of such groups of stations. N=8, for example. The N stations are plugged into a backplane FP which also supports 2N connection modules M1a, M1b, M2a, M2b, ..., MNa, MNb. In this example the maximum distance between two groups of stations is 100 meters or less. It is therefore possible to connect two consecutive groups of stations by means of electrical cables CE1, CE2, CE1', CE2' comprising a screened pair for each ring. This simplifies the implementation as it is not necessary to use costly, bulky and insufficiently reliable optical senders and receivers. Within each group of stations conductors of the backplane FP provide connections between the connection modules of the various stations.

These connections operate at 125 Mbauds, for example. In this case the phase jitter affecting the signals transmitted is in the order of a few nanoseconds to which are added a few nanoseconds distortion of the clock duty cycle. This is why it is necessary to regenerate the signal travelling round a ring if more than two switching modules operate to bypass the associated couplers.

In this example the connection modules M1a, M1b associated with the most upstream station S1 and the connection modules MNa, MNb associated with the most downstream station SN are used to connect this group of stations to two other groups of stations; the other connection modules are used to interconnect the other stations, known as intermediate stations, of the group in question. Accordingly, the connection modules M1a, M1b and MNa, MNb have inputs and outputs for screened cables CE1, CE2, CE1', CE2' and the other connection modules may comprise only inputs and outputs connected to conductors of the backplane FP.

The connection module M1a has an input for the screened cable CE1 supporting one segment of the first ring. The connection module M1b has one input for a screened cable CE2 supporting one segment of the second ring. The connection module MNa has one output for a screened cable CE1' supporting one segment of the first ring. The connection module MNb has one output for a screened cable CE2' supporting one segment of the second ring. All the connection modules M1a, M1b, ..., MNa, MNb each have a differential input and output respectively connected to a differential output and input of the station associated with the module in question by two differential lines each comprising two conductors of the backplane and a ground plane. Each connection module except modules MNa, MNb has a differential output connected to a differential input of another module by a differential line comprising two conductors. To make the diagram clearer the connections between the connection modules M1b, M2b, ..., MNb and the connections between these modules and the stations S1, ..., SN are not shown in FIG. 2. They are identical to the connections between the modules M1a, M2a, ..., MNa and the stations S1, ..., SN.

Separating the connection modules from the stations means that some stations can be disconnected or not installed without interrupting the operation of the rings. All station locations must be equipped with their two connection modules, however, to preserve the continuity of both rings.

Figure 3:
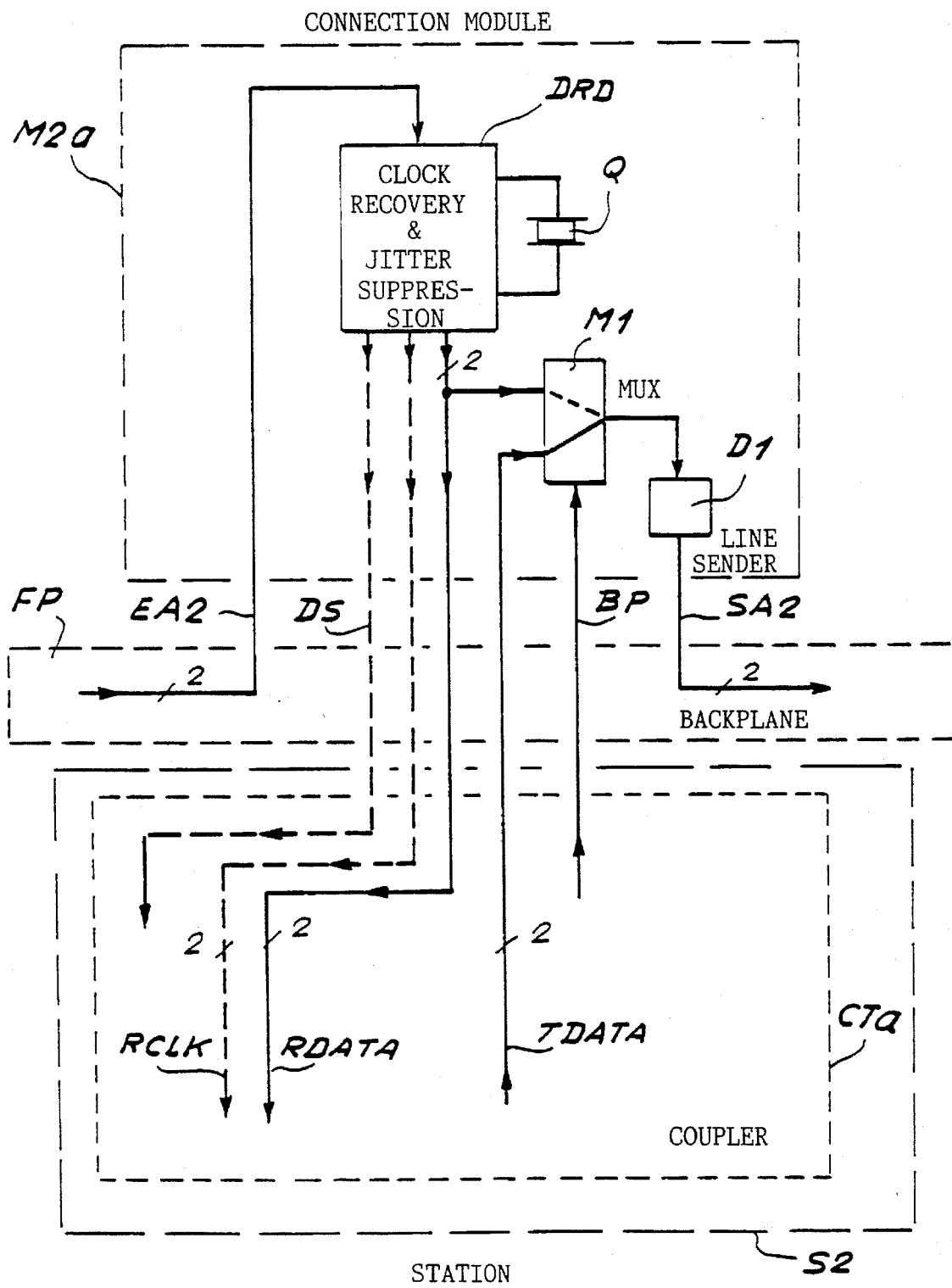
FIG. 3 shows a block diagram of one embodiment of a connection module which can be used for any station of the group except for the first and last stations of the group.

FIG. 3 shows the block diagram of one embodiment of a connection module suitable only for use as an intermediate module, for example the module M2a. It comprises a clock signal recovery and jitter suppressor circuit DRD associated with a quartz crystal Q, a multiplexer M1 with two inputs and one output and a line sender D1. All these components are implemented in ECL technology and all logic signals exchanged are at the levels for this technology. The module M2a has:

- a differential input EA2 connected to the connection module M1a associated with the upstream station S1;
- a differential output SA2 connected to the connection module M3a associated with the downstream station S3;
- a differential output RDATA supplying to the coupler CTa of the station S2 the binary signal received over the ring via the input EA2 after regenerating it (amplitude and phase);
- an optical differential output RCLK supplying a recovered clock signal to the send coupler CTa of the station S2 via the backplane FP;
- an optional output DS supplying a binary signal indicating detection of a data signal on the ring to the coupler CTa of the station S2 via the backplane FP;
- a differential input TDATA connected via the backplane FP to a differential output of the coupler CTa of the station S2 to receive in serial form a sequence of binary data to be transmitted over the ring; and
- an input BP connected via the backplane FP to the coupler CTa of the station S2 to receive a binary signal controlling the multiplexer M1.

The outputs RCLK and DS are optical as in some cases the send coupler CTa of the station can generate equivalent signals itself from data supplied by the RDATA output of the connection module M2a. The circuit DRD exists as a commercially available integrated circuit, for example the Siemens V23812 or the ATT TRU-200A.

The clock signal recovery and jitter suppressor circuit DRD has one input which constitutes the input EA2 and three outputs which respectively constitute the outputs DS, RCLK and RDATA. The RDATA output is also connected to a first input of the multiplexer M1. The second input of the multiplexer M1 is connected to the TDATA input. A control input of the multiplexer M1 is connected to the BP input. The output of the multiplexer M1 is connected to the SA2 output via the line sender D1.

When station S2 is present and in service it supplies to the BP input a constant level which switches the multiplexer M1 to send the binary signal supplied by station S2 at the TDATA input. When station S2 is out of service, and in particular if it is absent, the BP input is at a different level which switches the multiplexer M1 to send the binary signal regenerated by the circuit DRD.

Figure 4:
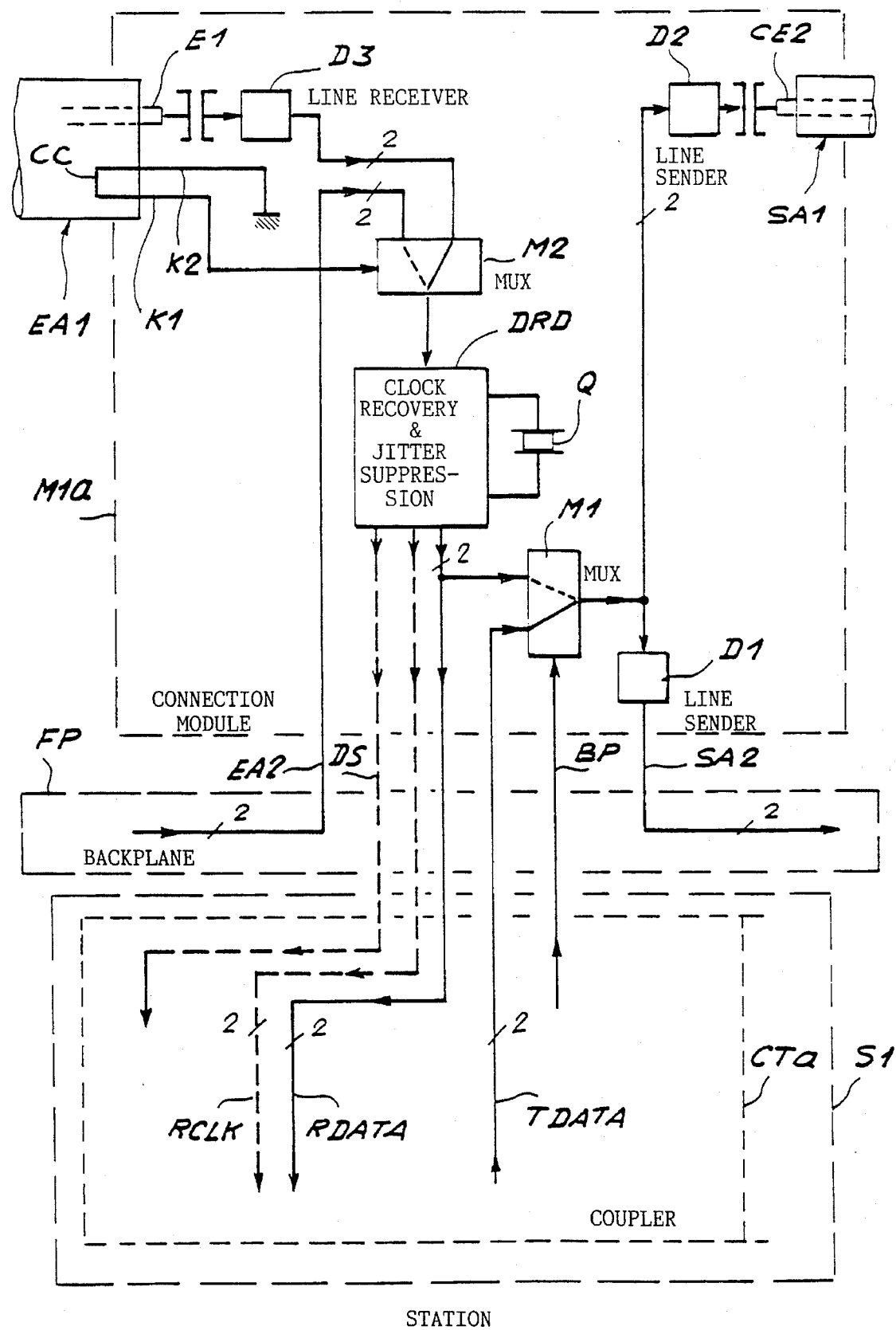
FIG. 4 shows the block diagram of one embodiment of a connection module which can be used for all the stations of the group if connection modules of a single type are to be used for all stations.

FIG. 4 shows the block diagram of a connection module which can be associated with the most upstream or the most downstream station in a group of stations or with an intermediate station of a group of stations. In this example it is the module M1a associated with S1. It comprises a number of elements identical to those of the module M2a previously described. These carry the same reference numbers. The additional elements are as follows:

- an input EA1 via a three-way connector (not shown) for connecting a screened pair CE1 and two further contacts K1 and K2 for connecting a short-circuit CC integrated into the connecting cable EA1 so that it is possible to sense the presence of the cable EA1 by detecting this short-circuit between the contacts K1 and K2;
- a line receiver D3 which has a differential input connected to the differential pair of the cable EA1;
- a multiplexer M2 implemented in the ECL technology, for example, and having three inputs and one output, the latter connected to the input of the circuit DRD instead of the input EA2 which is connected to a first input of the multiplexer M2, the second input of the multiplexer M2 being connected to the output of the line receiver D3, a control input of the multiplexer M2 being connected to the contact K1 and the contact K2 being connected to a reference potential;
- an output SA1 via a connector for connecting a cable comprising a screened pair CE2; and
- a line sender D2 whose output is connected to the screened pair of the cable CE2 and whose input is connected to the output of the multiplexer M1 like the input of the line sender D1.

When the input EA1 is connected to the cable CE1 associated with the short-circuit CC the contacts K1 and K2 are short-circuited and the control input of the multiplexer M2 is therefore connected to the reference potential. This reference potential switches the multiplexer M2 to connect the output of the line receiver D3 to the input of the clock recovery and jitter suppressor circuit DRD. If there is no cable connected to input EA1 the absence of the short-circuit CC means that the control input of the multiplexer M2 is not connected to the reference potential. The multiplexer M2 then sends the signal supplied to the input EA2 by a differential line of the backplane FP from a connection module associated with the upstream station.

In the case of the module M1a associated with station S1 there is no upstream station in the same group of stations. The module M1a is connected to another group by a cable CE1 and the multiplexer M2 is switched to connect the output of the line receiver D3 to the input of the circuit DRD. The multiplexer M2 is beneficial when it is required to use the same type of connection module for all stations S1, ... , SN. For an intermediate station the input EA1 is not used and the multiplexer M2 automatically switches the input of the circuit DRD to receive a signal from the input EA2.

No switching is necessary for the outputs SA1 and SA2 which supply two identical signals respectively supplied by the line senders D1 and D2 amplifying the signal from the output of the multiplexer M1. Depending on whether the station associated with the connection module is or is not the most downstream station in a group, the output SA2 or the output SA1 is used.

The function of the multiplexer M1 is as described previously with reference to FIG. 3.

Figure 5:
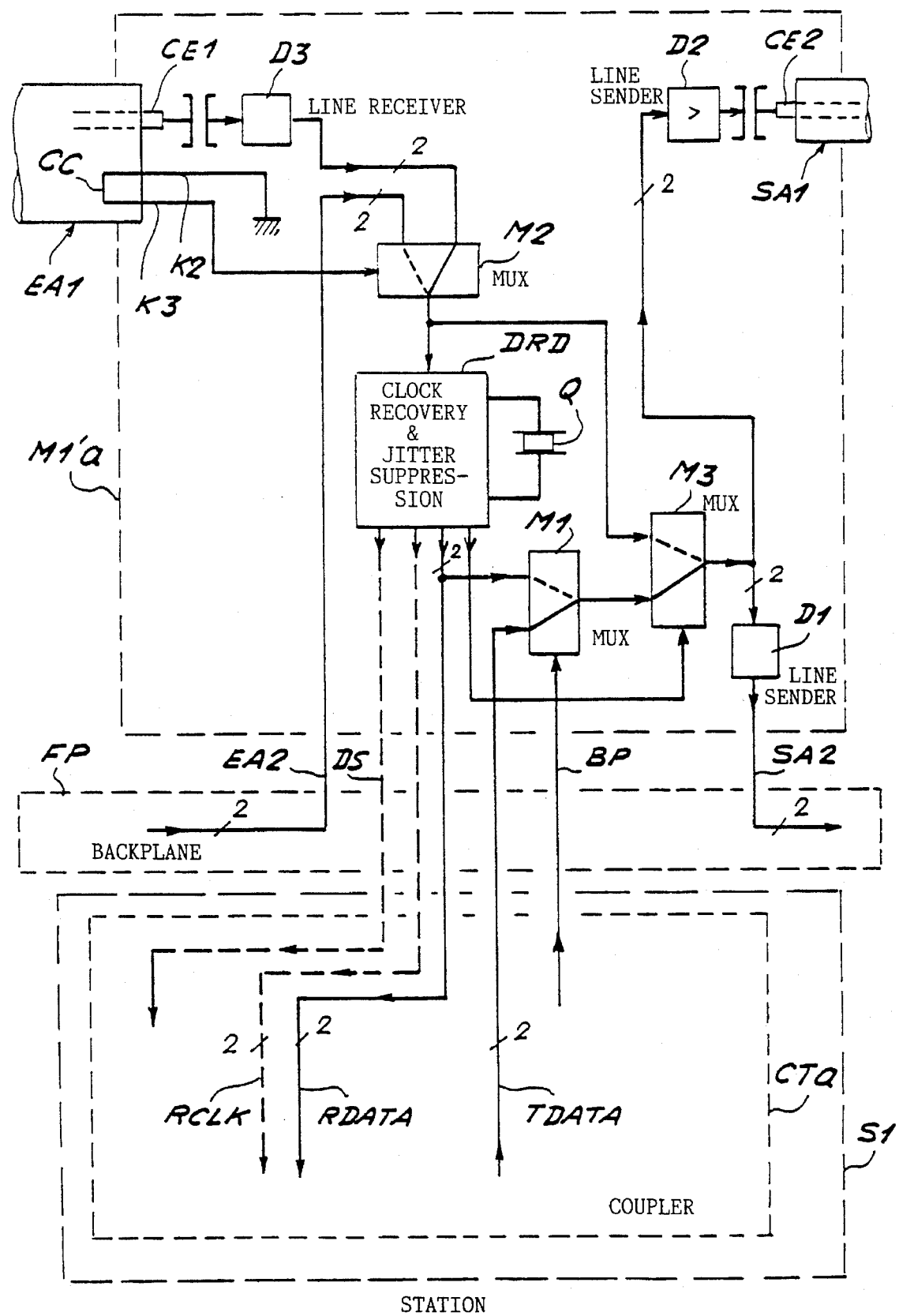
FIG. 5 shows the block diagram of a variant of the embodiment shown in FIG. 4 enabling the regenerator means to be bypassed.

FIG. 5 shows the block diagram of one embodiment of the module M1a shown in FIG. 4. This embodiment can also be used for all stations. It comprises an additional switch device for bypassing the clock recovery and jitter suppressor circuit DRD when it is out of service. As previously mentioned, bypassing a station without regenerating the signal increases the phase jitter to a degree which is tolerable for one station but which becomes intolerable if the number of stations bypassed in the same ring is increased. The additional switch device must therefore be used only in the case of failure of the circuit DRD of one connection module.

The module comprises a multiplexer M3 with two inputs and two outputs implemented in the ECL technology. The output of the multiplexer M1 goes to a first input of the multiplexer M3 instead of direct to the inputs of the line senders D1 and D2. A second input of the multiplexer D3 is connected to the output of the multiplexer M2. The output of the multiplexer M3 is connected to the inputs of the line senders D1 and D2. A control input of the multiplexer M3 is connected to an additional output of the clock signal recovery and jitter suppressor circuit DRD supplying a constant level signal when this circuit is operating correctly. When the control input of the multiplexer M3 receives this signal it is switched to send to the line senders D1 and D2 the signal from the output of the multiplexer M1. If the circuit DRD is not operating this signal is not received at the control input of the multiplexer M3 which is switched to send the signal from the output of the multiplexer M2 to the line senders D1 and D2. The circuit DRD is bypassed. The continuity of the ring is preserved but the signal is not regenerated.

The scope of the invention is not restricted to the embodiments described above and in particular is not limited to local area networks comprising two rings supported by electrical cables. The man skilled in the art will know how to apply the invention to networks comprising any number of rings and using another transmission medium such as optical fiber.

There is claimed:

1. Device for connecting stations to a local area network comprising one or more rings supplying signals to said device, said signals being generated by said stations, said connection device comprising a connection module for each of said stations and for each of said rings and said connection module comprising:

means for regenerating signals supplied by one of said rings, and first switch means to route said regenerated signals to a first station, said first station being one of said stations, when said first station is in service or to route said regenerated signals to a next station, bypassing said first station when said first station is not in service, each said connection module further comprising second switch means for routing the signals circulating in each ring in such a way as to bypass said means for regenerating when said first station is out of service and said means for regenerating are also out of service.

2. Device according to claim 1 wherein said means for regenerating comprise a narrowband filter for recovering a clock signal and filtering jitter affecting signals circulating on one of said rings corresponding to said means for regenerating.

3. Device according to claim 1 wherein said first switch means comprise means for sensing the presence of said first station connected to said connection module and for routing signals circulating on one of said rings corresponding to said connection module if said first station is absent.

4. Device according to claim 1 wherein for the local area network comprising one or more rings supported by an electrical cable said first switch means essentially comprise a high-speed technology multiplexer in said one or more rings in series with said means for regenerating and said second switch means essentially comprise a high-speed technology multiplexer in said one or more rings bypassing said first switch means and said means for regenerating when said first switch means and said means for regenerating are both out of service.

5. Device according to claim 1 for two rings each supported by a series of electrical conductors connecting stations grouped into a plurality of groups each plugged into a respective backplane further supporting connection modules associated with each of said plurality of groups of stations wherein all said connection modules are identical and each comprises:

a first ring input for connecting a first one of said connection modules to a second connection module by means of an electrical cable, said second connection module being located in a group different from said first one of said connection modules, a second ring input for connecting said first one of said connection modules to a third connection module, said one of said connection modules and said third connection module being located within one group of said plurality of groups of stations, by means of a backplane conductor of said one group, means for selecting automatically said first ring input on sensing the presence of a cable connected to said first ring input or said second ring input on sensing the absence of any cable connected to said first ring input, a first ring output for connecting a fourth one of said connection modules to a fifth connection module by means of an electrical cable, said fifth connection module being located in a group different from said fourth one of said connection modules and a second ring output for connecting said fourth one of said connecting modules to a sixth connection module, said fourth one of said connection modules and said sixth connection module being located within one group of said plurality of groups of stations, by means of a backplane conductor of said one group, said first and second ring outputs supplying two identical signals.

* * * * *